United States Patent [19]

Broyles

[11] Patent Number: 5,358,284

[45] Date of Patent: Oct. 25, 1994

[54] HIGH TEMPERATURE NON-METALLIC EXPANSION JOINT

[75] Inventor: Robert K. Broyles, Knoxville, Tenn.

[73] Assignee: Pathway Bellows, Inc., Oak Ridge, Tenn.

[21] Appl. No.: 1,762

[22] Filed: Jan. 7, 1993

[51] Int. Cl.⁵ ............................................. F16L 11/12
[52] U.S. Cl. ...................................... 285/47; 285/229
[58] Field of Search ......................... 285/229, 300, 47

[56] References Cited

U.S. PATENT DOCUMENTS

| | | | |
|---|---|---|---|
| 3,460,856 | 8/1969 | Van Tine et al. | 285/300 X |
| 3,730,566 | 5/1973 | Kazmierski et al. | 285/229 |
| 3,997,194 | 12/1976 | Eifer et al. | 285/300 X |
| 4,283,078 | 8/1981 | Ross et al. | 285/229 X |
| 4,685,703 | 8/1987 | Brock | 285/300 X |
| 4,848,803 | 7/1989 | Bachmann | 285/229 X |

OTHER PUBLICATIONS

"Sealing Components, Expansion Joints, For Lower Life-Cycle Costs in Hot Air and Gas Handling Applications", Manville (selected page).

Primary Examiner—Dave W. Arola
Attorney, Agent, or Firm—Lane, Aitken & McCann

[57] ABSTRACT

An expansion joint for connecting sections of a duct carrying high temperature gases includes upstream and downstream frame portions connected to the ducts, a peripheral fabric belt connecting the frame portions, and thermal insulation positioned between the belt and a primary internal liner mounted on a frame portion and projecting toward the opposite frame portion. A thermal insulation pillow is positioned between the primary internal liner and the flowpath, and a thermal panel made up of floating segments is positioned between the insulation pillow and the flowpath. At least the upstream frame portion includes a conical member extending at an oblique angle to inner and outer sides of the frame portion. In the illustrated embodiments, a secondary liner is mounted on the opposite frame portion and projects toward the frame portion carrying the primary liner, the primary internal liner being positioned between the secondary internal liner and the gas flowpath. An insulation pillow and thermal panel is also provided on the secondary internal liner.

20 Claims, 3 Drawing Sheets

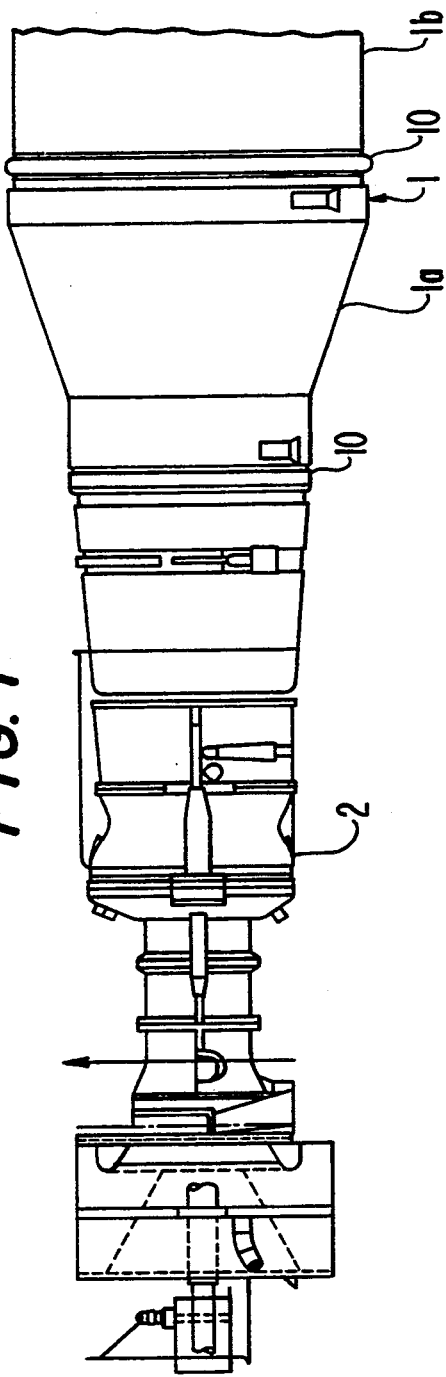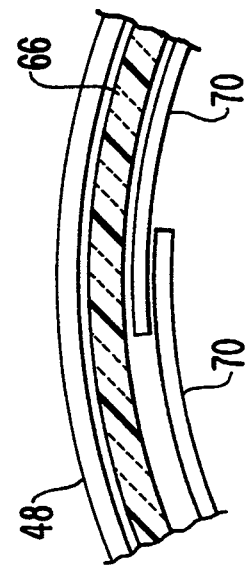

HIGH TEMPERATURE NON-METALLIC EXPANSION JOINT

BACKGROUND OF THE INVENTION

The present invention relates to expansion joints and, more particularly, to high temperature, non-metallic expansion joints for use in a high heat rate environment in ducts carrying gases.

Expansion joints are needed in ducts carrying high temperature gases. The demands on the expansion joints are greater where the high temperature gases are characterized by high turbulence, fast heat rate, high gas flow rate, or any combination of these, and/or where large movements and high cycles of movement are required of the expansion joint. These conditions can exist in cogeneration facilities for generating electricity and/or steam, gas transmission pump stations, power peaking plants, dryers and gas turbine engine test stands.

The frames associated with known non-metallic expansion joints for use under these conditions experience cracking as a result of 1) high heat rates, 2) high temperature differentials across the frame, and 3) high localized stresses, primarily in welds attaching liners, or sleeves, to the rest of the expansion joint. The liners are made of plates adjacent to and parallel to the flowing high temperature gases and surrounding the flowing gases. As a result of this configuration, the liners heat quickly and tend to expand quickly as a result of the fast temperature rise. However, they are welded to members of the expansion joint which extend away from the hot gases and, therefore, heat and expand more slowly than the liners. Consequently, high stresses occur in the welds attaching the liners to the other members, leading to failures in the expansion joint at the welds.

Furthermore, some prior art frames include members which extend perpendicular to the flowpath of the gases all the way from an inner side of the frame to the outer side of the frame. Such members are particularly unable to accommodate expansion from the thermal shock from the start-up of, for example, a gas turbine, as well as the contraction due to the thermal shock of shutting down the turbine. In addition, poor frame configuration and insulation schemes have led to premature failure of the non-metallic expansion joint components.

SUMMARY OF THE INVENTION

By the present invention, thermal stress in the frame components is reduced. In order to reduce the thermal stress, the frame components are insulated, thereby reducing the rate of heating of the frame components and allowing them to heat more uniformly. This is especially true where frame elements, such as the liners, are welded. More specifically, insulation is placed between the liners and the gas flow to act as a buffer between the hot gas and the frame components. Thus, the insulation slows the temperature rise in the liner, so that the rate of temperature rise in the liner is closer to the rate of the temperature rise in the frame members to which the liner is welded.

Thermal panels connected to the liners are positioned between the insulation and the gas stream in order to protect the insulation from the eroding action of the hot flowing gases. The thermal panels are made of a plurality of floating plates, or segments, covering an inner surface of the insulation and overlapping one another in the circumferential direction. The overlapping arrangement helps the thermal panels accommodate expansion and contraction. In addition, the plates are connected to the liners by fasteners on which the plates can move radially outward. The thermal panels also act as smooth surfaces to reduce the turbulence of the gas flow at the joint.

The frame includes conical members positioned between the inner and outer sides of the frame. The conical members are more flexible than radially extending members and, therefore, are better able to accommodate expansion and contraction.

BRIEF DESCRIPTION OF THE DRAWINGS

FIG. 1 is a front view of an exhaust duct for a gas turbine having two expansion joints according to the present invention;

FIG. 3 is a cross-section taken along the line 3—3 in FIG. 2; and

DETAILED DESCRIPTION OF THE PREFERRED EMBODIMENTS

As can be seen from FIG. 1, a duct, such as the duct 1, is needed to direct the flow of hot gases from a source, such as a gas turbine 2. Arrangements of a source of hot gases and an associated duct are found in cogeneration plants for generating electricity or steam, gas transmission pump stations, power peaking plants, dryers and gas turbine engine test stands. The gas turbine 2 is charactistically turned on and off often and, when it is turned on, there is a sudden flow of very hot gases through the duct 1. The temperature of the gas in the duct typically goes from ambient temperature to about 700° F. (371° C.) in about 4 seconds, and then continues to rise to about 1100° F. (593° C.). Even temperatures of 1250° F. (677° C.) can be encountered. The duct 1 is made of metal which expands significantly with increases in temperature, and so expansion joints 10 are needed in the duct 1 to accommodate the expansion and contraction of the metal of the duct 1.

Figure 2:
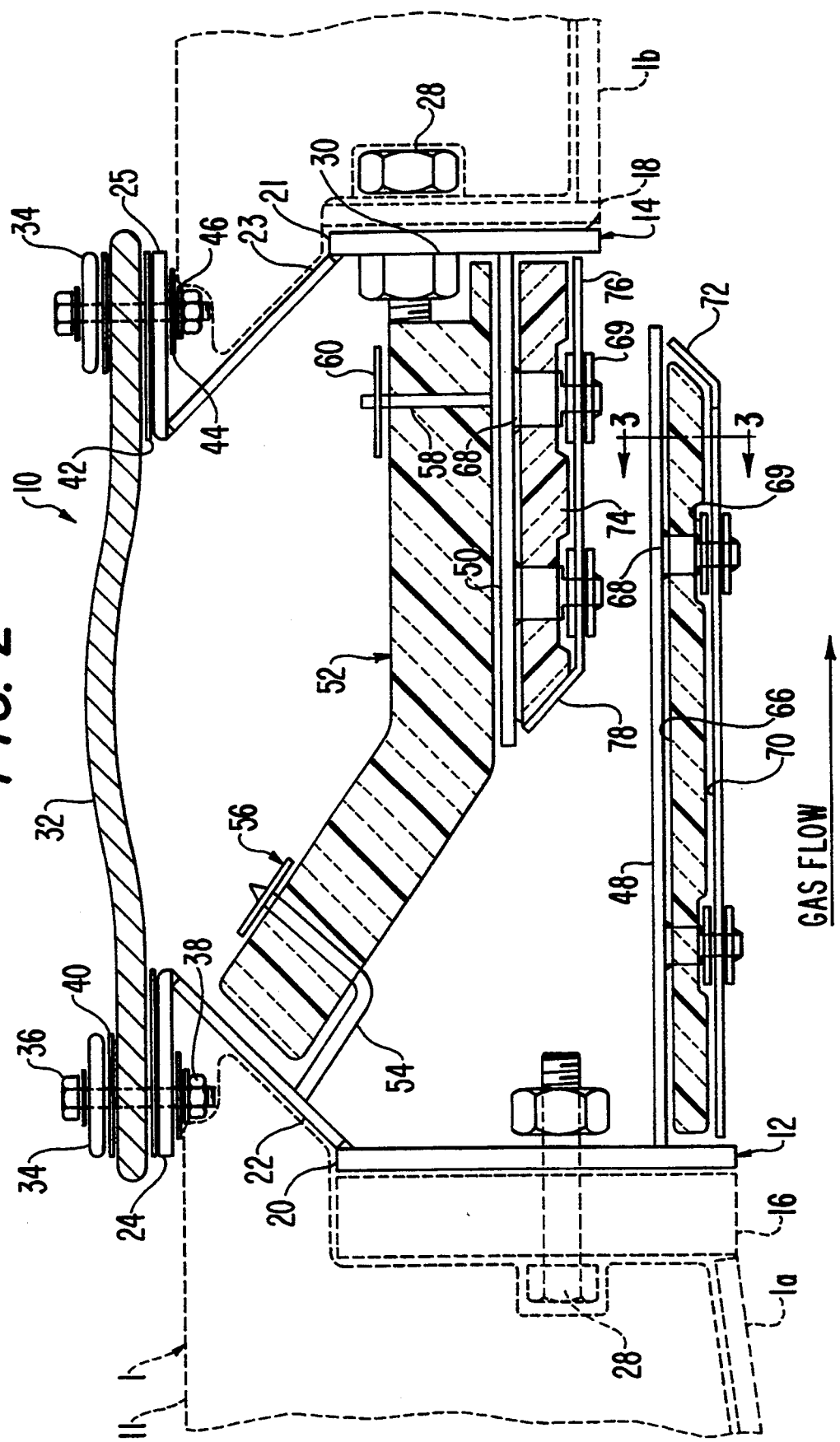
FIG. 2 is a transverse cross-section through a portion of one of the expansion joints of FIG. 1.

As can be appreciated from FIG. 2, a first embodiment of the expansion joint according to the present invention, which is designated generally by the reference numeral 10, joins two sections 1a and 1b of the duct 1 defining a flowpath for hot gases. Only an upper portion of the expansion joint 10 and upper portions of the sections 1a and 1b of the duct 1 are shown in FIG. 2, the duct 1 having external insulation 11. In the illustrated embodiment, the expansion joint 10 and the duct 1 are circular, forming a cylinder around the hot flowing gases. However, the expansion joint 10 according to the present invention is also applicable to ducts which are rectangular in cross section or which have other shapes. Thus, the portion of the expansion joint 10 and the duct 1 illustrated in FIG. 1 represents one side of the perimeter of the expansion joint 10 and the duct 1.

The expansion joint 10 includes a first frame portion 12 attached to an upstream duct section 1a and a second frame portion 14 attached to a downstream duct section 1b. The upstream and downstream duct sections 1a, 1b include flanges 16 and 18, respectively, to facilitate the attachment of the frame portions 12, 14 of the expansion joint 10 to the duct sections. Each frame portion 12, 14 includes a first member 20, 21 extending radially away from the longitudinal axis of the duct 1, a second, conical member 22, 23 extending at an oblique angle toward the opposite frame portion 12 or 14, and a third, outer member 24, 25 having a width parallel to the longitudinal axis of the duct 1 and extending from a circumferential line of attachment to a second end of the conical member 22, 23 and away from the opposing frame portion 12, 14. In the illustrated circular embodiment, each of the aforesaid first frame members 20, 21 is annular. In a rectangular embodiment, the length of each of the first frame members 20, 21 extends transverse to the longitudinal axis of the duct 1, for the full length of one of the sides of the perimeter of the rectangular expansion joint. In the embodiment illustrated, the upstream first frame member 20 has a greater transverse, or radial, dimension than does the downstream first frame member 21, making the expansion joint 10 well-suited for installation where the upstream duct section 1 is smaller than the downstream duct section, such as at the exhaust of a gas turbine. The first frame members 20, 21 are attached to the flanges 16, 18 of the duct sections 1 by bolts 28 and nuts 30, as is conventional.

A fabric belt 32 extends across and between the outer frame members 24 and 25 and all around the perimeter of the expansion joint 10. Edges of the fabric belt 32 are secured to the outer frame members 24, 25 by clamping the edges between the outer frame members and backup bars 34, which extend along each side of the perimeter of the expansion joint 10. The clamping force is provided by a plurality of bolts 36 and nuts 38 spaced along the circumference of the outer frame members 24, 25 and backup bars 34. Gasket strips 40 are provided between the backup bars 34 and the exterior surface of the fabric belt 32. Other gasket strips 42 are provided between the outer frame members 24, 25 and the interior surface of the belt 32, and still other gasket strips 44 are provided between the outer frame members 24, 25 and washers 46 employed with the nuts 38 at the bottoms of the bolts 36. All of the gasket strips can be made of woven fiberglass.

A primary circular internal liner, or sleeve, 48, made of an annular metal plate, has a circumference around the gas flowpath defined by the duct 1 and the expansion joint 10 and an axial dimension parallel to the direction of flow, that is, parallel to the longitudinal axis of the duct 1. The primary internal liner 48 is secured to the upstream first frame member 20 by welding or other suitable arrangement. The axial dimension of the primary internal liner 48 extends most of the distance across the axial dimension, or width, of the expansion joint 10. A secondary circular internal liner, or sleeve, 50 is made from an annular metal plate, such as a plate secured by welding to the first frame member 21 of the downstream frame portion 14.

The secondary internal liner 50 extends upstream slightly more than half the width of the expansion joint 10 and has a larger circumference than the primary internal liner 48. Accordingly, the primary and secondary internal liners 48, 50 overlap axially with an annular, radial gap between them. Since high temperatures are involved, for example, temperatures of 1250° F. (677° C.), insulation is provided in the expansion joint 10, between the fabric belt 32 and the duct 1 carrying the hot gases, in order to protect the fabric belt 32 from the high temperatures of the hot gases. In the illustrated embodiment, the insulation includes an insulation pillow, or bag, 52 of, for example, fiberglass connected to the upstream conical member 22 by studs 54 and speed washers 56 which are spaced circumferentially along the conical member 22. The insulation pillow 52 extends across the width of the expansion joint 10, first perpendicularly from the conical member 22 to approximately the upstream end of the secondary internal liner 50 and then parallel to the exterior surface of the secondary internal liner 50 to the first member 21 of the downstream frame portion 14, so that a bend is formed in the insulation pillow 52. The insulation pillow 52 typically includes a body of fiberglass wrapped with cloth material which is stapled along the edges, and that is wrapped with wire mesh. The insulation pillow 52 is connected to the outer surface of the secondary internal liner 50 by studs 58 and speed washers 60 secured to the downstream end of the liner 50.

In conventional expansion joints, the flow of hot gases in the ducts impinges the plate of the primary circular internal liner 48, thereby rapidly heating the plate. The rapid heating causes stress in the plate, especially at the welds attaching the plate to the upstream frame portions.

As can be seen from FIG. 2, additional insulation is provided between the inner surface of the primary internal liner 48 and the longitudinal axis of the expansion joint 10 and duct 1. In the illustrated embodiment, the insulation takes the form of an insulation pillow 66 of ceramic fibers attached to the inner surface of the primary internal liner 48, substantially covering the surface. The attachment is accomplished by studs 68 welded to the inner surface of the primary internal liner 48 and extending through the insulation pillow 66. Washers 69 are slidably positioned on the studs 68, one washer on each side of the liner 48. A thermal panel 70 is positioned between the insulation pillow 66 and the axis of the expansion joint 10, and is supported by the washers 69, between the washers at the inner ends of the studs 68.

As can be seen from FIG. 3, the thermal panel 70 is made up of a plurality of panel segments covering the inner annular surface of the insulation pillow 66, the panel segments overlapping one another in the circumferential direction so as to accommodate rapid thermal expansion. The washers 69 are slidably mounted on a reduced diameter portion of the studs 68, and the axial length of the reduced diameter portion is greater than the combined thicknesses of the thermal panel 70 and washers 69. Accordingly, upon thermal expansion, the segments of the thermal panel 70 are free to move outward on the reduced diameter portions of the studs 68.

The insulation pillow 66 acts as a heat shield reducing the rate of heating of the primary internal liner 48. This brings the heating rate and thermal expansion rate of the primary internal liner 48 more in line with the corresponding rates of the first frame member 20 to which the primary internal liner is welded. As a result, the stress on the liner 48 and the member 20, and especially on the welds, is reduced, and cracking of the liner 48 and the member 20, and especially on the welds is reduced, and cracking of the liner 48, the member 20 and/or the welds is avoided. The thermal panel 70 includes a flange 72 on each panel segment angled toward the primary internal liner 48, terminating adjacent to the downstream end of the liner. The upstream end of the thermal panel 70 almost touches the upstream frame portion 12. Thus, the thermal panel 70 and the primary internal liner 48 form an enclosure for the insulation pillow 66, thereby protecting the insulation pillow from the eroding action of the hot flowing gases.

An insulation pillow 74 of ceramic fibers, similar to the insulation pillow 66, is attached to the inner surface of the secondary internal liner 58, substantially covering the surface. The attachment is accomplished by studs 68 and washers 69 in the same manner as for the insulation pillow 66. A thermal panel 76 is similar to the thermal panel 70 and is made up of a plurality of panel segments covering the inner annular surface of the insulation pillow 74. The thermal panel 76 includes on each panel segment a flange 78 angled toward the secondary internal liner 50, terminating adjacent to the upstream end of the liner.

The frame members 20-25, the primary internal liner 48, the secondary internal liner 50, and the segments of the thermal panels 70 and 76 can all be made of T347 stainless steel.

Figure 4:
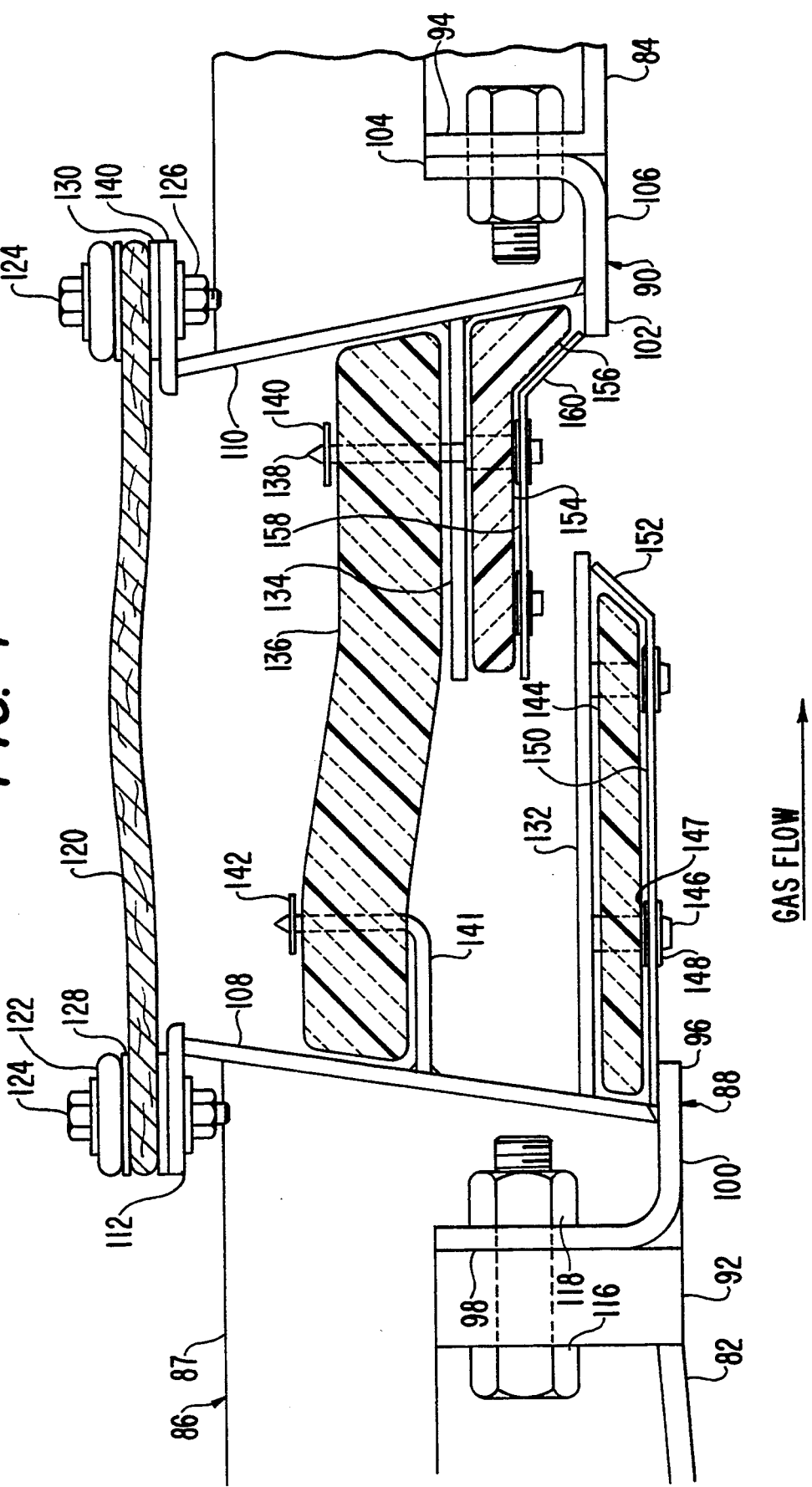
FIG. 4 is a transverse cross-section through a portion of a second embodiment of the expansion joint according to the present invention.

As can be seen from FIG. 4, another embodiment of the expansion joint according to the present invention which is designated generally by the reference numeral 80, connects an upstream duct section 82 and a downstream duct section 84 of a duct 86. Only an upper portion of the expansion joint 80 and upper portions of the sections 82 and 84 of the duct 86 are shown in FIG. 2. The duct has external insulation 87, and gas flow is from left to right. The expansion joint 80 and the duct 86 can be circular in transverse cross-section, or can be rectangular, or have other shapes. The construction, materials, and functioning of the expansion joint 80 is the same as that of the expansion joint 10 except as distinguished by the present description and/or the drawing figures.

The expansion joint 80 includes a first frame portion 88 attached to the upstream duct section 82 and a second frame portion 90 attached to the downstream duct section 84. The duct sections 82, 84 include radially extending flanges 92 and 94, respectively, to which the frame portions 88 and 90 are secured. The frame portion 88 includes a first, generally L-shaped member 96 having a first leg 98 extending parallel to and in alignment with the flange 92, and a second leg 100 extending generally parallel to the duct section 82. The frame portion 90 includes a first, L-shaped member 102 having a first leg 104 extending parallel to and in alignment with the flange 94, and a second leg 106 extending parallel to the duct section 84. Each frame portion 88, 90 also includes a second, conical member 108 and 110, respectively, which is secured to the leg 98, 104 of the first member 88, 90. Each conical member 108, 110 extends generally away from the flowpath of the gas and at a slight inclination toward the opposite frame portion of the expansion joint 80. Each frame portion 88, 90 further comprises a third, outer member 112, 114 having a width parallel to the longitudinal axis of the duct 86, extending from a circumferential line of attachment to a second end of the oblique member 108, 110 and away from the opposing frame portion 88, 90. Where the expansion joint 80 encompasses a circle, each of the first, second and third members of the frame portions 88 and 90 is annular. In a rectangular embodiment, the length of each of the members extends transverse to the longitudinal axis of the duct 86. In the embodiment illustrated in FIG. 4, the upstream first frame member 96 has a greater transverse, or radial, dimension than does the downstream second frame member 102, making the expansion joint 80 well-suited for installation where the upstream duct section 82 is smaller than the downstream duct section 84. The first frame members 96, 102 are attached to the flanges 92, 94 of the duct sections 82, 84 by bolts 116 and nuts 118.

A fabric belt 120 extends across and between the outer frame members 112 and 114, to which edges of the fabric belt 120 are secured by clamping the edges between the outer frame members and back-up bars 122. The clamping force is provided by bolts 124 and nuts 126, and gasket strips 128 are provided between the back-up bars 122 and the exterior surface of the fabric belt 120. Other gasket strips 130 are provided between the outer frame members 112, 114 and the interior surface of the belt 120.

A primary internal liner 132, made of an annular metal plate, is secured to the upstream second frame member 108. A secondary internal liner 134 is made from an annular metal plate and secured by welding to the second frame member 110 of the downstream frame portion 90. The secondary internal liner 134 has a larger circumference than the primary internal liner 32, and the liners overlap considerably with a substantial annular gap between them. An insulation pillow 136 is secured in the space between the fabric belt 120 and the secondary internal liner 134, extending substantially the entire distance between the oblique members 108 and 110 of the first and second frame portions 88, 90 and throughout the annulus defined by the expansion joint 80. One edge of the insulation pillow 136 is secured to an outer surface of the secondary internal liner 134 by a plurality of circumferentially spaced studs 138 on which speed washers 140 are secured. The studs 138 are mounted on the secondary internal liner 134, and the speed washers 140 retain the insulation pillow 136 on the studs. The opposite edge of the fabric belt 120 is held next to the conical member 108 by angled studs 140 extending from the conical member 108 and projecting outward toward the fabric belt 120. Speed washers 142 are secured on the studs 141.

As with the embodiment of FIG. 2, the primary internal liner 132 of the embodiment of FIG. 4 includes an insulation pillow 144 positioned between the inner surface of the primary internal liner 132 and the longitudinal axis of the expansion joint 80 and duct 86. The insulation pillow 144 is attached to the inner surface of the primary internal liner 132, substantially covering the surface. The attachment is accomplished by studs 146 and washers 147 and 148 in the same manner as in the FIG. 2 embodiment. In addition, a thermal panel 150 is positioned between the insulation pillow 144 and the axis of the expansion joint 80, and is supported by the washers 147. The thermal panel 150 comprises a plurality of panel segments each having a flange 152 angled toward the primary internal liner 132, terminating adjacent to the downstream end of the liner. The conical member 108 is welded to the leg 100 of the L-shaped first member 96 slightly downstream of the end of the leg member. The thermal panel 150 overlaps and engages the portion of the leg member 100 extending beyond the conical member 108.

In addition to providing thermal protection for the primary internal liner 132, the embodiment of Fig. 4 provides thermal protection for the secondary internal liner 134. More specifically, an insulation pillow 154 attached to the inner surface of the secondary internal liner 134, substantially covering the surface. The attachment is accomplished by studs 146 and washers 147 and 148 in the same manner as the insulation pillow 144 is attached to the primary internal liner 132. The insulation pillow 154 includes a tapering portion 156 extending toward the leg 106 of the L-shaped member 102. A thermal panel 158 is positioned between the insulation pillow 154 and the axis of the expansion joint 80, and is supported by the washers 147, 148 between the washers at the inner ends of the studs 146. Like the insulation pillow 144, the insulation pillow 154 acts as a heat shield reducing the rate of heating of the secondary internal liner 134. As a result, the stress on the liner 134 and the conical member 110 of the downstream flame portion 90, and especially on the welds between them, is reduced, and cracking of the liner 134 and the welds is avoided. The thermal panel 158 comprises a plurality of panel segments each having an angled portion 160 angled toward the end of the leg 106 of the L-shaped first member 102, terminating adjacent to the upstream end of the leg. The end of the angled portion 160 almost touches the upstream end of the leg 106, thereby forming an enclosure for the insulation pillow 154. This arrangement not only protects the insulation pillow 154 from the eroding action of the hot flowing gases, it also substantially reduces direct flow of hot gases against the secondary internal liner 134 and the welds connecting the liner to the oblique member 110.

It will be apparent to those skilled in the art and it is contemplated that variations and/or changes in the embodiments illustrated and described herein may be made without departure from the present invention. For example, the secondary internal liner, which is the downstream liner, and its associated insulation blanket and thermal panel, can be omitted. In addition, the downstream frame portion can be constructed without a conical member and include instead a member or members of different configuration. Furthermore, other variations and/or changes can be made without departure from the present invention. Accordingly, it is intended that the foregoing description is illustrative only, not limiting, and that the true spirit and scope of the present invention will be determined by the appended claims.

I claim:

1. An expansion joint for use in connection with a high-temperature medium, comprising:
   a first frame portion having a length;
   a second frame portion having a length, said first and second frame portions being spaced from one another in a direction transverse to said lengths;
   means for connecting said first and second frame portions to one another;
   a first metal element connected to said first frame portion, said first element projecting from said first frame portion toward said second frame portion;
   thermal insulation positioned between said first metal element and said connecting means; and
   means for thermally insulating said first metal element from the high-temperature medium.

2. The expansion joint of claim 1, wherein said thermal insulation is positioned between said connecting means and the high-temperature medium.

3. The expansion joint of claim 1, further comprising a second metal element connected to said second frame portion, said second metal element projecting toward said first frame portion and overlapping said first metal element.

4. The expansion joint of claim 3, wherein said thermal insulation is positioned between said connecting means and said second metal element.

5. The expansion joint of claim 3, further comprising means for thermally insulating said second metal element from the high-temperature medium.

6. The expansion joint of claim 5, wherein said means for thermally insulating said second metal element comprises thermal insulation material positioned between said second metal element and the high temperature medium.

7. The expansion joint of claim 6, wherein the high-temperature medium is a gas, and the expansion joint further comprises means for protecting from the gas the thermal insulation material positioned between said second metal element and the high-temperature medium.

8. The expansion joint of claim 6, wherein the thermal insulation material positioned between said second metal element and the high-temperature medium comprises ceramic fibers.

9. The expansion joint of claim 1, wherein said means for thermally insulating said first metal element comprises thermal insulation material positioned between said first metal element and the high-temperature medium.

10. The expansion joint of claim 9, wherein said thermal insulation material comprises ceramic fibers.

11. The expansion joint of claim 9, wherein the high-temperature medium is a gas, and the expansion joint further comprises means for protecting from the gas the thermal insulation material positioned between said first metal element and the high-temperature medium.

12. The expansion joint of claim 11, wherein each of said first frame portion, said second frame portion, said means for connecting said first and second frame portions, said first metal element, and said means for thermally insulating said first metal element from the high-temperature medium define structures surrounding the gas.

13. The expansion joint of claim 11, wherein said protecting means is a plate interposed between said thermal insulation material and the gas.

14. The expansion joint of claim 13, wherein said plate is mounted on said first metal element.

15. The expansion joint of claim 14, wherein the gas flows relative to the expansion joint, and said plate has a downstream end with respect to the gas flow and a flange projecting toward said first metal element at said downstream end.

16. The expansion joint of claim 1, wherein said first metal element is welded to said first frame portion.

17. The expansion joint of claim 1, wherein said connecting means is a fabric belt.

18. The expansion joint of claim 1, wherein the expansion joint has a side on which the high-temperature medium is present, and said first frame portion is generally transverse to said first metal element, said first frame portion extending beyond said first metal element in a direction away from the side of the expansion joint on which the high-temperature medium is present.

19. The expansion joint of claim 1, wherein said first and second frame portions each have an inner side adjacent to the high-temperature medium and an outer side distal to the high-temperature medium, and said first frame portion includes a conical member extending at an oblique angle to said inner and outer sides.

20. The expansion joint of claim 19, wherein said second frame portion includes a conical member extending at an oblique angle to said inner and outer sides.

* * * * *